United States Patent Office 3,376,149
Patented Apr. 2, 1968

3,376,149
PREPARATION OF CARBON BLACK DISPERSION FOR PRODUCING A HIGH OPTICAL DENSITY OF CELLULOSE ACETATE FILM BASE
Gerald Clifford Gandy and Martin Salo, Kodak Park, Rochester, N.Y., assignors to Eastman Kodak Company, Rochester, N.Y., a corporation of New Jersey
No Drawing. Filed Mar. 25, 1966, Ser. No. 537,283
9 Claims. (Cl. 106—193)

ABSTRACT OF THE DISCLOSURE

This invention is directed to special methods and compositions for preparing opaque cellulose acetate films that contain particles of carbon black dispersed therein. The methods involve initially the preparation of a concentrate of the carbon black and an alcohol soluble cellulose butyrate with appropriate organic solvents. This concentrate is then dispersed in a solution of a high acetyl cellulose acetate (from about 42.5 to about 44% acetyl) in appropriate organic solvents to yield a useful film casting composition.

---

The present invention relates to the preparation of special films consisting mostly of cellulose acetate. More particularly, this invention relates to novel intermediate compositions that are useful in the manufacture of cellulose acetate films that contain carbon black; to special processes for the manufacture of these novel intermediate compositions; and to overall processes for the manufacture of cellulose acetate films containing, dispersed therein, extremely small particles of carbon black.

The type of cellulose acetate films to which the present invention is directed is that class termed the "high acetyl" cellulose acetate films, made from cellulose acetate having an acetyl content of from about 42.5 to about 44%. These "high acetyl" cellulose acetate films have been found to have sufficiently high strength, high moisture resistance, and high resistance to rupture by folding or tearing to be particularly useful as "bases" for both motion picture film and for "still" picture film. A detailed description of such "high acetyl" cellulose acetate films, as well as detailed processes for their preparation, can be found in United States Patent 2,739,069, the disclosure of which is hereby incorporated into the present disclosure by reference.

It will be noted that U.S. Patent 2,739,069 is especially directed to processes involving initially the preparation of a casting solution comprising from about 14 to about 19% (based on the weight of the entire casting composition) of one of the "high acetyl" cellulose acetates described above, plus suitable plasticizer(s), dissolved in a solvent mixture having approximately the following composition (percentages are by weight of the solvent mixture):

| | Percent |
|---|---|
| Methylene chloride | 83–93 |
| Methyl alcohol | 2–5 |
| n-Butyl alcohol | 5–12 |

The process of the present invention are directed to these same basic processes, except that, for the incorporation of carbon black, uniformly into the resulting films, some unique modifications of these basic processes had to be invented. These modifications will be described in detail below.

For many years there has existed a need for films such as the "high acetyl" cellulose acetate films described above which, in addition to their excellent physical properties, also have a high optical density, (i.e., they are practically impermeable to light). High optical density in these films can be achieved in many ways. For example, carbon black and/or intensely colored (dark) dyes, and the like, can be utilized. Of these the least expensive, and generally most desirable "optical densifier" is carbon black. However, heretofore, a commercially successful method of incorporating carbon black into the essential "high acetyl" cellulose acetate films (made via the solvent casting process detailed above and in U.S. Patent 2,739,069) had not been developed due largely to the fact that, when attempts are made to simply blend carbon black into either the casting solutions or the solvent mixtures and to disperse the carbon black adequately (i.e., through the casting solution or the solvent mixture in the form of individual particles of a sufficiently small size; wherein the average particle diameter is below about 250 millimicrons, and preferably between about 7 and 80 millimicrons) through the final casting solutions, the systems either gelled to the extent that they could not be cast well or satisfactory dispersions could not be obtained. Thus, prior to the present invention, manufacturers of "high acetyl" cellulose acetate "high optical density" films (i.e., those having a specular density of at least about 7, measured on a 3.5 mil film throughout the range of light having wavelengths of from about 350 to about 720 millimicrons) had to utilize a dye, such as, for example, nigrosine, in amounts sufficiently large to impart to the film the necessary optical density. Not only has the use of dyes for this purpose been undesirably expensive, but their use also often causes processing difficulties. For example, due to migration and exudation of the dyes from the film, build-up of dye on film casting equipment occurs, necessitating periodic shut-downs to clean the equipment. Often, flaking of dye particles from the equipment occurs during processing, resulting in the formation of "out of specification" film base. From this, it can be seen that there has been, for many years, a strong need for methods of eliminating the difficulties resulting from the use of dyes to obtain the desired high optical density in "high acetyl" cellulose acetate films, by incorporating carbon black into such films successfully.

It has now been discovered that carbon black can be incorporated into "high acetyl" cellulose acetate films in the necessary amounts and in the necessary, vary finely dispersed form, provided certain critical elements (relating to both the compositions and the processing steps that are utilized) are observed. Thus, carbon black can be incorporated successfully into the ultimate, "high acetyl" cellulose acetate casting solutions if it is first blended and milled in the preparation of a "dispersed carbon concentrate" having a distinctly different chemical constitution than that of the ultimate of final, desired, casting composition. After the carbon black is dispersed into the so-called "dispersed carbon concentrate" in accordance with the processes of this invention, it can readily be blended with appropriate solvents and with the "high acetyl" cellulose acetate in appropriate proportions to result in the formation of final casting compositions having the necessary constitution described above.

The "dispersed carbon concentrate" mentioned above generically consists essentially of a mixture of materials having the following approximate composition ("percent"=by weight).

| | Percent |
|---|---|
| Carbon black | 5–25 |
| Methyl alcohol | 5–75 |
| "Alcohol soluble" cellulose butyrate | 0.5–20 |
| Methylene chloride | 0–35 |
| Butyl alcohol | 0–85 |

Preferred "dispersed carbon concentrates" consist essentially of mixtures having the following approximate composition:

| | Percent |
|---|---|
| Carbon black | 10–20 |
| Methyl alcohol | 20–60 |
| "Alcohol soluble" cellulose butyrate | 2–10 |
| Methylene chloride | 0–30 |
| Butyl alcohol | 0–68 |

Some of the still further preferred compositions of the "dispersed carbon concentrates" of the present invention are illustrated hereinafter in the "Examples." It should be noted that the terms "consisting essentially" and "consists essentially," as used herein, are not intended to be strictly limiting in scope. Thus, when compositions are described herein as "consisting essentially" of certain materials in certain amounts, it is expected that, in many instances, other unnamed materials can and will be added to the specified materials for use in the processes and compositions of this invention. Such unspecified materials will be of the type and in amounts that will, however, not completely destroy the efficacy of these compositions for their intended purpose.

Any carbon black can be used successfully in the processes of this invention so long as its ultimate average particle size (diameter) is within the range of from about 5 to about 250 millimicrons, and preferably within the range of from about 8 to about 80 millimicrons. By "ultimate particle size" is meant the size of the individual carbon particles, and not the size of carbon black "agglomerates" (the form in which carbon black is usually presently available commercially). The "ultimate particle size" can be determined by suspending the carbon black sample in an organic solvent, passing the suspension through an efficient conventional pigment dispersion mill, and then quickly measuring the average particle size of the dispersed carbon black.

Surprisingly, the key to the success of the processes of the present invention relates to the following practices:

(1) the use of a special cellulose ester (herein termed an "alcohol soluble cellulose butyrate") in the preparation of the "dispersed carbon concentrates" of the present invention;
(2) the use of a special solvent system in these "dispersed carbon concentrates;" and
(3) the application of the action of a pigment dispersion mill to the "dispersed carbon concentrate" prior to the preparation of the final casting compositions in order to reduce agglomerates of carbon black into their ultimate, individual particles.

The required solvent systems have been set out hereinbefore.

The "alcohol soluble cellulose butyrate" that must be utilized in the present processes can be prepared via the processes described in United States patent application, Ser. No. 237,305, now abandoned, filed Nov. 13, 1962. It can contain from about 43.5 to about 52.5% (preferably from about 45% to about 49%) of butyryl, from none to about 4.5% (preferably from about 1.5% to about 3%) of acetyl, and from about 3 to about 10% (preferably from about 4% to about 6%) of hydroxyl, and has an intrinsic viscosity within the range of from about 0.3 to about 1.5 (preferably from about 0.4 to about 1).

The "dispersed carbon concentrates" of the present invention can be prepared by simply intermixing the various ingredients in a conventional blender until at least a part of the alcohol soluble cellulose butyrate has been dissolved in the solvent fraction. Then the entire mixture is subjected to the action of a conventional pigment dispersion mill. Any of the well known, readily available, conventional pigment dispersion mills can be utilized for this step in the present processes. Essentially all that needs to be accomplished in this "dispersion" step is the breaking apart of the agglomerates of carbon black into their individual particles. When this step is performed in the presence of the alcohol soluble cellulose butyrate (in accordance with the processes of the present invention) the undesired very high degree of gelling that was previously a serious problem does not occur. Rather the result is a blend of carbon black, almost entirely dispersed in the form of individual particles, through the solvent system. Some of the "dispersed carbon concentrates" of the invention exhibit thixotropic properties. However, this does not interfere with the successful usage of the concentrates because the thixotropy disappears for a time when the concentrates are stirred or otherwise agitated sufficiently.

Some of the "dispersed carbon concentrate" compositions of the present invention are illustrated below. In each of the following examples, all parts given are parts by weight unless otherwise specified.

EXAMPLE I

| Materials: | Parts |
|---|---|
| Carbon black [1] | 15 |
| Alcohol soluble cellulose butyrate [2] | 2.5 |
| Methyl alcohol | 9.2 |
| Butyl alcohol | 73.3 |

[1] Average ultimate particle size is about 9 millimicrons.
[2] Intrinsic viscosity=0.55; 46.5% butyryl; 2.2% acetyl; 5% hydroxyl.

EXAMPLE II

| Materials: | Parts |
|---|---|
| Carbon black [1] | 17.1 |
| Alcohol soluble cellulose butyrate [2] | 2.9 |
| Methyl alcohol | 43.3 |
| Butyl alcohol | 36.7 |

[1] Average ultimate particle size is about 20 millimicrons.
[2] Intrinsic viscosity=0.7; 48% butyryl; 2% acetyl; and 5% hydroxyl.

EXAMPLE III

| Materials: | Parts |
|---|---|
| Carbon black [1] | 20 |
| Alcohol soluble cellulose butyrate [2] | 2.5 |
| Methylene chloride | 28 |
| Methyl alcohol | 29 |
| Butyl alcohol | 25.5 |

[1] Average ultimate particle size is about 40 millimicrons.
[2] Intrinsic viscosity=0.4; 49% butyryl; 1.5% acetyl; and 4% hydroxyl.

EXAMPLE IV

| Materials: | Parts |
|---|---|
| Carbon black [1] | 150 |
| Alcohol soluble cellulose butyrate [2] | 75 |
| Methylene chloride | 232 |
| Methyl alcohol | 543 |

[1] Average ultimate particle size is about 10 millimicrons.
[2] Intrinsic viscosity=0.8; 47.5% butyryl; 6% acetyl; and 3.5 hydroxyl.

EXAMPLE V

| Materials: | Parts |
|---|---|
| Carbon black [1] | 125 |
| Alcohol soluble cellulose butyrate [2] | 100 |
| Methylene chloride | 232 |
| Methyl alcohol | 543 |
| Butyl alcohol | 110 |

[1] Same as in Example I.
[2] Same as in Example III.

The following specific example illustrates not only typical manipulative procedures that can be used in the successful practice of the present invention, but also the preparation of a particularly preferred embodiment of this invention. It should be noted that any of the "dispersed carbon concentrates" described above can be prepared in the manner set out in the following example, and also that any of the final casting compositions of this invention can be prepared in the following manner.

EXAMPLE VI

A. Preparation of "Dispersed carbon concentrate"

Into a conventional stainless steel mixing vessel fitted with a fairly efficient stirrer are poured 2500 parts of methylene chloride and 5750 parts of methyl alcohol. Into this solvent blend are then poured slowly (over a period of about 5 minutes) 250 parts of alcohol soluble cellulose butyrate (having an intrinsic viscosity of 0.6; 47% butyryl; 2.4% acetyl; and 4.5% hydroxyl). The resulting mixture is stirred for an additional 3 minutes in order to dissolve substantially all of the cellulose butyrate. Into the resulting solution are then quickly poured 1500 parts of carbon "beads" (supplied under the name "Vulcan SC," a trade name of the Cabot Corporation). The resulting mixture is then transferred to a conventional Kady (pigment dispersion) mill, where it is mixed continuously for about 15 minutes, while maintaining the temperature of the contents of the mill below about 50° C. with external water cooling. This is the "dispersed carbon concentrate." It is then transferred into stainless steel drums for storage until it is used to prepare one of the final casting compositions of this invention.

B. Preparation of the final casting composition

Into a conventional glass lined mixing vessel are charged 7307 parts of methylene chloride, 493 parts of butyl alcohol, and 411 parts of methyl alcohol. Into this solvent mixture are then poured 1790 parts of a blend containing (a) "high acetyl" cellulose acetate (43.5% acetyl), (b) triphenyl phosphate, and (c) di-methoxy ethyl phthalate in a weight ratio, respectively, of 100:10:5. The resulting mixture is stirred until all of the cellulose acetate has been dissolved, yielding a clear, fairly viscous plasticized solution of "high acetyl" cellulose acetate.

Then, into 10,000 parts of this plasticized "high acetyl" cellulose acetate solution is blended the "dispersed carbon concentrate" prepared in step A, above. The resulting final casting solution can be filtered through a suitable filter if desired to remove any lumps that may be present. It contains 2.3% of very finely dispersed carbon black, and is practically perfectly suited for use in conventional processes for casting opaque film base, yielding a film having exceptional tear and moisture resistance and a specular density (measured on a 3.5 mil film) of at least 7.5.

As it was stated above, the final casting compositions of the present invention must contain essentially the same ingredients as the casting compositions described in U.S. Patent 2,739,069. That is, they must contain from about 14 to about 24 weight percent of high acetyl cellulose acetate (having an acetyl content of from about 42.5 to about 44 percent), and from about 70 to about 85.5 weight percent of a solvent fraction. The solvent fraction of these final casting compositions must cotnain from about 83 to about 93 weight percent of methylene chloride, from about 2 to about 5 weight percent of methyl alcohol, and from about 5 to about 12 weight percent of butyl alcohol. In addition, the final casting compositions of the present invention will contain from about 0.5 to about 5 weight percent of very finely dispersed carbon black, and from about 0.01 to about 4 weight percent of "alcohol soluble" cellulose butyrate, as described hereinbefore. Such final casting compositions also generally contain one or more of any of the plasticizers or antioxidants, and the like, the specific identity of which are well known to those ordinarily skilled in the art and unimportant in so far as the successful practice of the present invention is concerned.

Since itnermediate compositions such as those prepared initially in step B of Example VI, above are to be blended in appropriate proportions with the "dispersed carbon concentrates" of this invention, and since it is the resulting final casting solutions that must have the composition described immediately above, it can be appreciated that these "intermediate" compositions (containing the dissolved "high acetyl" cellulose acetate) must sometimes, of necessity, vary somewhat in composition from that of the "final casting compositions" described above. However, in general these "intermediate" compositions should have the following approximate compositions:

| Ingredients: | Percent |
|---|---|
| "High acetyl" cellulose acetate | 14–26 |
| Solvent mixture A | 74–86 | wherein "Solvent mixture A" has the following approximate compositions:

| | Percent |
|---|---|
| Methylene chloride | 83–93 |
| Methyl alcohol | 2–5 |
| Butyl alcohol | 5–12 |

Although in the foregoing examples, processes are described in which the "dispersed carbon concentrate" and an "intermediate" plasticized solution of high acetyl cellulose acetate are prepared separately, and then intermixed, it should be understood that in the practice of the process aspect of this invention, the only critical aspect is that the "dispersed carbon concentrate" must be prepared as a separate operation. If desired, for example, the solvent, high acetyl cellulose acetate, plasticizers, and any other desired additives, stabilizers, and the like, can be blended into the "dispersed carbon concentrate" (rather than being first blended in a separate operation as they were in step B of Example VI, above). Thus, into the "dispersed carbon concentrate," for example, in a conventional mixer can be poured the solvents, cellulose acetate, plasticizer(s), antioxidants, etc. necessary to make up the desired final casting solution, and the resulting solution can then be stirred until the cellulose acetate has been dissolved. Also, the entire step A of Example VI can be accomplished in the pigment dispersion mill if desired.

What is claimed is:

1. In a process for manufacturing a cellulose acetate film by casting a plasticized solution of from about 14 to about 24 weight percent (based on the weight of the entire casting composition) of cellulose acetate havin gan acetyl content of from about 42.5 to about 44 percent, and from about 0.5 to about 5 weight percent (based on the weight of cellulose acetate in said casting composition) of carbon black uniformly dispersed through said casting composition, in a solvent mixture having the following approximate composition:

| | Percent |
|---|---|
| Methylene chloride | 83–93 |
| Methyl alcohol | 2–5 |
| Butyl alcohol | 5–12 | the improvement which comprises (a) initially preparing a dispersed carbon concentrate by subjecting a mixture having the following approximate composition:

| | Percent |
|---|---|
| Carbon black | 5–25 |
| Methylene chloride | 0–35 |
| Methyl alcohol | 5–75 |
| Alcohol soluble cellulose butyrate | 0.5–20 |
| Butyl alcohol | 0–85 | to the action of a pigment dispersion mill to thereby intimately disperse the individual particles of said carbon black through said dispersed carbon concentrate, and (b) thereafter intermixing said dispersed carbon concentrate and a solution of said cellulose acetate in said solvent mixture to thereby form said casting composition.

2. A process as in claim 1, wherein said dispersed carbon concentrate has the following approximate composition:

| | Percent |
|---|---|
| Carbon black | 10–20 |
| Methylene chloride | 0–30 |
| Methyl alcohol | 20–60 |
| Alcohol soluble cellulose butyrate | 2–10 |
| Butyl alcohol | 0–68 |

3. A process as in claim 1, wherein said dispersed carbon concentrate has the following approximate composition:

| | Percent |
|---|---|
| Carbon black | 15 |
| Methylene chloride | 25 |
| Methyl alcohol | 57.5 |
| Alcohol soluble cellulose butyrate | 2.5 | and said solvent mixture has the following approximate composition:

| | Percent |
|---|---|
| Methylene chloride | 89 |
| Methyl alcohol | 5 |
| Butyl alcohol | 6 |

4. A process for manufacturing cellulose acetate film having a high optical density, which process comprises the steps of (1) separately preparing
(a) a dispersed carbon concentrate, and
(b) a plasticized solution of a high acetyl cellulose acetate; said dispersed carbon concentrate being a mixture having the following approximate composition:

| | Percent |
|---|---|
| Carbon black | 5–25 |
| Methylene chloride | 0–35 |
| Methyl alcohol | 5–75 |
| Butyl alcohol | 0–85 |
| Alcohol soluble cellulose butyrate | 0.5–20 | wherein said alcohol soluble cellulose butyrate is dissolved in said concentrate and said carbon black is intimately dispersed through said concentrate in the form of individual particles having an average size of between 5 and about 250 millimicrons; and said plasticized solution of high acetyl cellulose acetate being a solution of from about 14 to about 26 weight percent of cellulose acetate (having an acetyl content of from about 42.5 to about 44 percent) in a solvent mixture A having the following approximate composition:

| | Percent |
|---|---|
| Methylene chloride | 83–93 |
| Methyl alcohol | 2–5 |
| Butyl alcohol | 5–12 | and (2) thereafter intermixing said dispersed carbon concentrate and said plasticized solution of cellulose acetate in appropriate proportions to thereby yield a casting composition containing the following approximate composition:

| | Percent |
|---|---|
| High acetyl cellulose acetate | 14–24 |
| Carbon black | 0.5–5 |
| Solvent mixture A | 70–85.5 |

5. A process as in claim 4, wherein said dispersed carbon concentrate has the following approximate composition:

| | Percent |
|---|---|
| Carbon black | 10–20 |
| Methylene chloride | 0–30 |
| Methyl alcohol | 20–60 |
| Butyl alcohol | 0–68 |
| Alcohol soluble cellulose butyrate | 2–10 | and said casting composition has the following approximate composition:

| | Percent |
|---|---|
| High acetyl cellulose acetate | 14–24 |
| Carbon black | 0.5–5 |
| Solvent mixture A | 70–85.5 |

6. A process as in claim 4, wherein said dispersed carbon concentrate has the following approximate composition:

| | Percent |
|---|---|
| Carbon black | 15 |
| Methylene chloride | 25 |
| Methyl alcohol | 57.5 |
| Alcohol soluble cellulose butyrate | 2.5 | said casting composition has the following approximate composition:

| | Percent |
|---|---|
| High acetyl cellulose acetate | 14–19 |
| Carbon black | 0.5–5 |
| Solvent mixture A | 70–85.5 | and said solvent mixture A has the following approximate composition:

| | Percent |
|---|---|
| Methylene chloride | 89 |
| Methyl alcohol | 5 |
| Butyl alcohol | 6 | said carbon black having an ultimate average particle size of from about 8 to about 80 millimicrons, said high acetyl cellulose acetate having an acetyl content of about 53%, and said alcohol soluble cellulose butyrate having an intrinsic viscosity of about 0.6, and containing about 47% butyryl, about 2.4% acetyl, and about 4.5% hydroxyl.

7. A dispersed carbon concentrate composition having the following approximate composition:

| | Percent |
|---|---|
| Carbon black | 5–25 |
| Alcohol soluble cellulose butyrate | 0.5–20 |
| Methyl alcohol | 5–75 |
| Butyl alcohol | 0–85 |
| Methylene chloride | 0–35 | said carbon black being intimately dispersed through said concentrate composition in the form of individual particles having an average diameter of from about 5 to about 250 millimicrons.

8. A dispersed carbon concentrate composition having the following approximate composition:

| | Percent |
|---|---|
| Carbon black | 10–20 |
| Alcohol soluble cellulose butyrate | 2–10 |
| Methyl alcohol | 20–60 |
| Butyl alcohol | 0–68 |
| Methylene chloride | 0–30 | said carbon black being intimately dispersed through said concentrate composition in the form of individual particles having an average diameter of from about 8 to about 80 millimicrons.

9. A casting composition, useful in the manufacture of opaque film base, having the following approximate composition:

| | Percent |
|---|---|
| High acetyl cellulose acetate | 14–24 |
| Alcohol soluble cellulose butyrate | 0.1–4 |
| Carbon black | 0.5–5 |
| Solvent mixture | 70–85.5 | said carbon black being intimately dispersed through said casting composition in the form of individual particles having an average diameter of from about 5 to about 250 millimicrons and said solvent mixture having the following approximate composition:

| | Percent |
|---|---|
| Methylene chloride | 83–93 |
| Methyl alcohol | 2–5 |
| Butyl alcohol | 5–12 |

No references cited.

MORRIS LIEBMAN, Primary Examiner.

H. H. FLETCHER, Assistant Examiner.